(12) United States Patent
Bernauer et al.

(10) Patent No.: US 6,655,217 B1
(45) Date of Patent: Dec. 2, 2003

(54) TRANSMITTER

(75) Inventors: Andreas Bernauer, Schopfheim (DE); Hansjörg Brock, Grenzach-Wyhlen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 17 days.

(21) Appl. No.: 09/639,415

(22) Filed: Aug. 14, 2000

(30) Foreign Application Priority Data

Sep. 15, 1999 (EP) .............................. 99118287

(51) Int. Cl.$^7$ ................................ G01L 9/12
(52) U.S. Cl. .......................................... 73/718
(58) Field of Search .............................. 73/718; 200/5; 341/22, 34; 128/680

(56) References Cited

U.S. PATENT DOCUMENTS

| | | | | |
|---|---|---|---|---|
| 4,207,443 A | * | 6/1980 | Matsuura | 200/5 |
| 5,241,308 A | * | 8/1993 | Young | 341/22 |
| 5,255,686 A | * | 10/1993 | Takeda et al. | 600/494 |
| 5,353,200 A | * | 10/1994 | Bodin | 361/816 |
| 5,973,621 A | * | 10/1999 | Levy | 341/22 |

* cited by examiner

Primary Examiner—Edward Lefkowitz
Assistant Examiner—Jewel Thompson
(74) Attorney, Agent, or Firm—Bose McKinney & Evans LLP

(57) ABSTRACT

A transmitter is provided whose operation is not impaired by ambient influences, having a measurement sensor (3), an electronic unit (11) arranged in a housing (1) on a printed circuit board (9), an operating element (15), which can be operated from outside the housing (1), and a transmitting arrangement (19), which transmits a force exerted on the operating element (15) to a switch connected to the electronic unit (11), the switch being a key of a membrane keyboard (23) arranged on the printed circuit board

7 Claims, 3 Drawing Sheets

TRANSMITTER

FIELD OF THE INVENTION

The invention relates to a transmitter.

BACKGROUND OF THE INVENTION

Transmitters are measurement apparatuses which detect one or more physical quantities, convert them into an electrical quantity and make measured values corresponding to the physical quantities available for further display and/or processing.

Examples are pressure measurement apparatuses, filling level measurement apparatuses and flow rate measurement apparatuses. Transmitters are used in a multiplicity of branches of industry, e.g. in installations in the chemical industry, in the foodstuffs industry or in the field of water supply. Their range of application extends from simple measurement and display through to measured value generation for process automation.

A transmitter has at least one measurement sensor for detecting at least one physical quantity. The measurement sensor typically supplies a raw signal during operation. The raw signal is fed to an electronic unit which generates from the raw signal a measurement signal corresponding to a present measured value and makes it accessible for further display and/or processing.

Information, data and/or details which depend on the specific use of the transmitter and/or the place where the latter is used are generally required for generation of the present measured value. These information, data and/or details are preferably interrogated, input and/or changed on site by means of operating elements which are accessible from outside the transmitter.

In measurement and control technology, transmitters are used for example which have a measurement sensor and an electronic unit which is arranged in a housing on a printed circuit board, and which has an area on which two conductor tracks are exposed. A force exerted on an operating element which is accessible from outside the housing moves a plunger in the direction of the printed circuit board until the said plunger bears on both the conductor tracks and effects an electrically conductive connection between the two conductor tracks. The two conductor tracks form a switch which is closed by the plunger.

This arrangement affords the advantage that the operating elements are conveniently accessible from outside the housing and, at the same time, the operating information is present directly, via the switch, wherever it is required, namely in the electronic unit. The electronic unit can thus be near to the measurement sensor In order that the shortest possible line paths are present and are nevertheless addressed externally directly via the operating elements. Short line paths are advantageous insofar as the risk of interference being coupled in and the measurement result being corrupted because of this is low if there are short lines.

What is disadvantageous however, is the fact that the plunger and the two conductor tracks are exposed. There is the risk of oxidation and corrosion of these components. In addition, the ingress of moisture into the housing can lead to undesired short-circuits which the electronic unit cannot distinguish from an intentionally performed switching operation.

SUMMARY OF THE INVENTION

An object of the invention is to specify a transmitter whose operation is not impaired by ambient influences.

For this purpose, the invention consists in a transmitter having a measurement sensor, an electronic unit arranged in a housing on a printed circuit board, an operating element, which can be operated from outside the housing, and a transmitting arrangement, which transmits a force exerted on the operating element to a switch connected to the electronic unit, the switch being a key of a membrane keyboard arranged on the printed circuit board.

In accordance with one embodiment, the membrane keyboard is an integral part of the printed circuit board.

In accordance with one development, the membrane keyboard is arranged on an area of the printed circuit board, on which at least two conductor tracks are exposed. It has a spacer membrane, which covers the area and which has perforations at the locations at which an electrical connection can be established between two conductor tracks. Furthermore, it has a covering membrane, which is arranged on the spacer membrane and which has contact elements on inner areas which cover the perforations and face the printed circuit board.

In accordance with one embodiment, covering membrane, spacer membrane and printed circuit board form a key in the region of each perforation and a pressure exerted on the key causes the covering membrane to flex in such a way that the respective contact element effects an electrically conductive connection between the two conductor tracks.

In accordance with a further embodiment, a surface of the printed circuit board including the electronic unit and the membrane keyboard is surface-treated, in particular coated, to provide protection against moisture.

The Invention and the advantages thereof will now be explained in more detail with reference to the figures of the drawing, which illustrate an exemplary embodiment. Identical elements are provided with the same reference symbols in the figures.

DETAILED DESCRIPTION OF EXEMPLARY EMBODIMENTS

Figure 1:
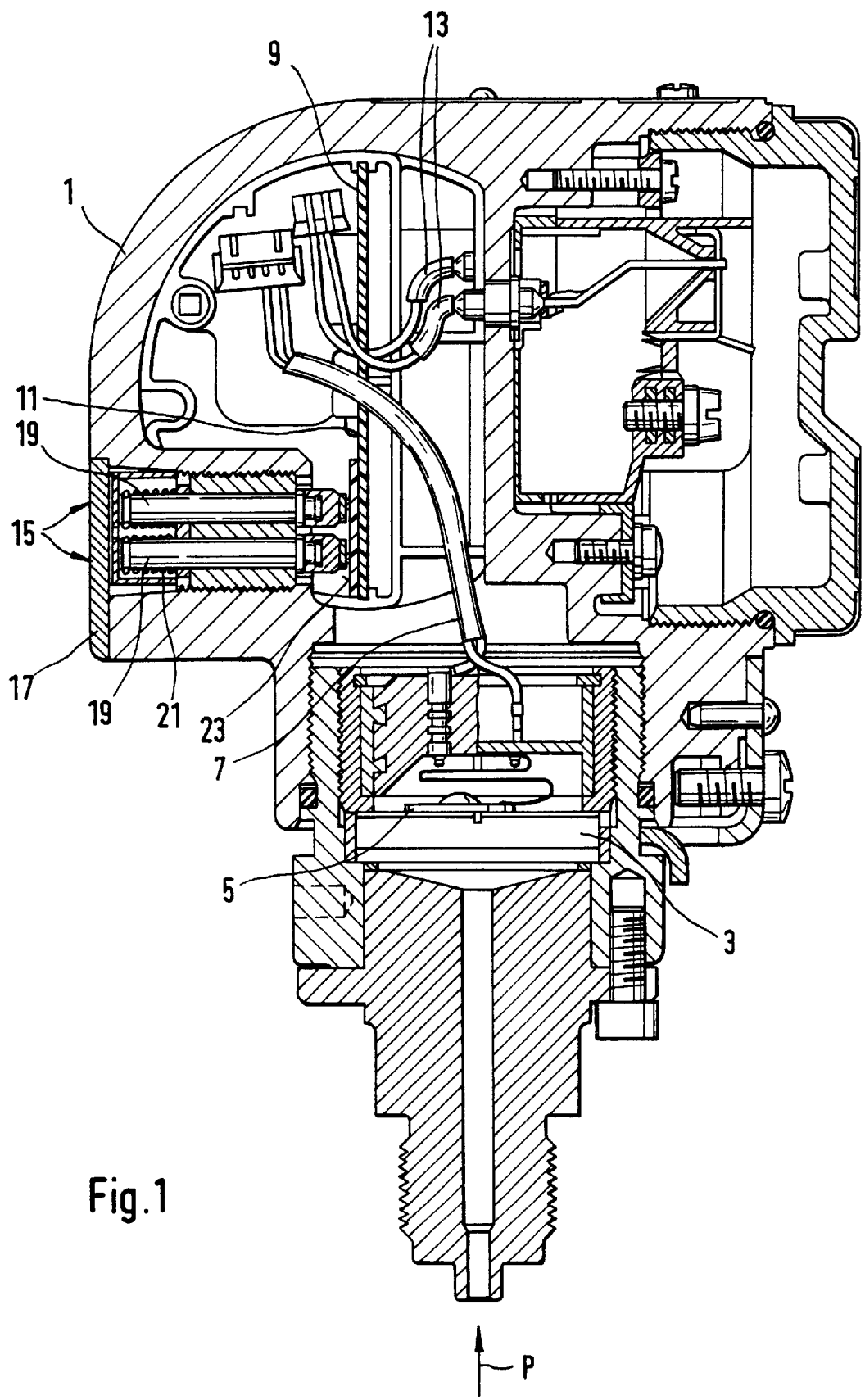
FIG. 1 shows a section through a transmitter.

FIG. 1 shows a section through a transmitter. The transmitter is a pressure measurement apparatus in this exemplary embodiment. However, the invention is not restricted to pressure transmitters but rather can also be used in any other transmitters.

The transmitter has a housing 1 and a measurement sensor 3. In the exemplary embodiment shown, the measurement sensor 3 is a capacitive ceramic pressure measuring cell with a base body and a measurement diaphragm. The measurement diaphragm and the base body are connected to one another in a pressure-tight and gas-tight manner at their edge, by means of a joining point, to form a measurement chamber. A pressure P acting on the measurement diaphragm effects deflection of the measurement diaphragm from the latter's position of rest.

An electrode is arranged on an inner side of the measurement diaphragm and at least one counterelectrode is arranged on an opposite inner side of the base body. electrode and counterelectrode form a capacitor. A converter circuit 5 is provided on the base body and converts changes in the capacitance of the capacitor into an electrical quantity, e.g. into a correspondingly changing electrical voltage.

Other transmitters, of course, have measurement sensors. What is common to all of them, however, is that the measurement sensors detect a physical measurement quantity and convert it into an electrical quantity. As a rule, transmitters have a converter circuit via which the electrical quantity is fed as raw signal to a downstream electronic unit.

In the case of the transmitter of FIG. 1, the converter circuit 5 is connected via connecting lines 7 to an electronic unit 11 arranged in the housing 1 on a printed circuit board 9. In the electronic unit 11, the incoming electrical quantity is detected and from it a measured value is determined and a measurement signal is generated, which is available for display and/or processing via connecting lines 13. In order to determine the measured value and in order to generate the measurement signal, the raw signal generated by the converter circuit 5 is conditioned. That requires not only measurement sensor-specific information, such as e.g. characteristic curves, correction quantities for the compensation of measurement errors, details concerning the measurement range, etc., but also information, data and/or details which depend on the specific use of the transmitter and/or the place where the latter is used. These information, data and/or details cannot be fed in at the factory, but rather have to be interrogated, input and/or changed on site. Examples thereof are the zero point of a pressure sensor, which must be set at the measurement site, a unit at which the measurement result is to be expressed, and/or a measurement range that can be chosen by the user.

For this purpose, the transmitter has operating elements 15 which are accessible from outside the transmitter. In the exemplary embodiment shown, the operating elements 15 are keypads marked on a housing cover 17. The housing cover 17 is flexible in the region of the keypads. A pressure exerted on a keypad causes the keypad to flex. Inside the housing 1, a transmitting arrangement 19 is arranged behind each keypad and transmits a force exerted on the operating element 15 to a switch connected to the electronic unit 11. In the exemplary embodiment shown, the transmitting arrangements 19 are plungers pre-tensioned by means of springs 21. Each spring is compressed by pressure on the keypad which is spatially assigned to it and the plunger is moved in the direction of the printed circuit board 9, where it meets the corresponding switch and triggers a switching operation.

Instead of the keypads described, levers, pushbuttons or similar components could, of course, also be used as operating elements. The transmitting arrangements must then be designed appropriately such that they transmit a force exerted on an operating element to the switch.

According to the invention, the switches are keys of a membrane keyboard 23 arranged on the printed circuit board 9.

Figure 2:
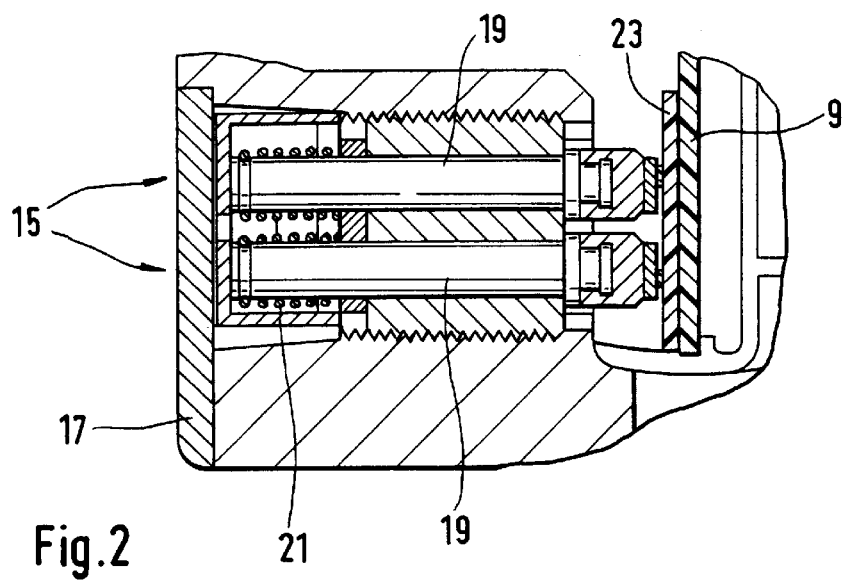
FIG. 2 shows an enlargement of a detail from FIG. 1, which illustrates the operating elements, the transmitting arrangements, the membrane keyboard, and a portion of the printed circuit board.
Figure 3:
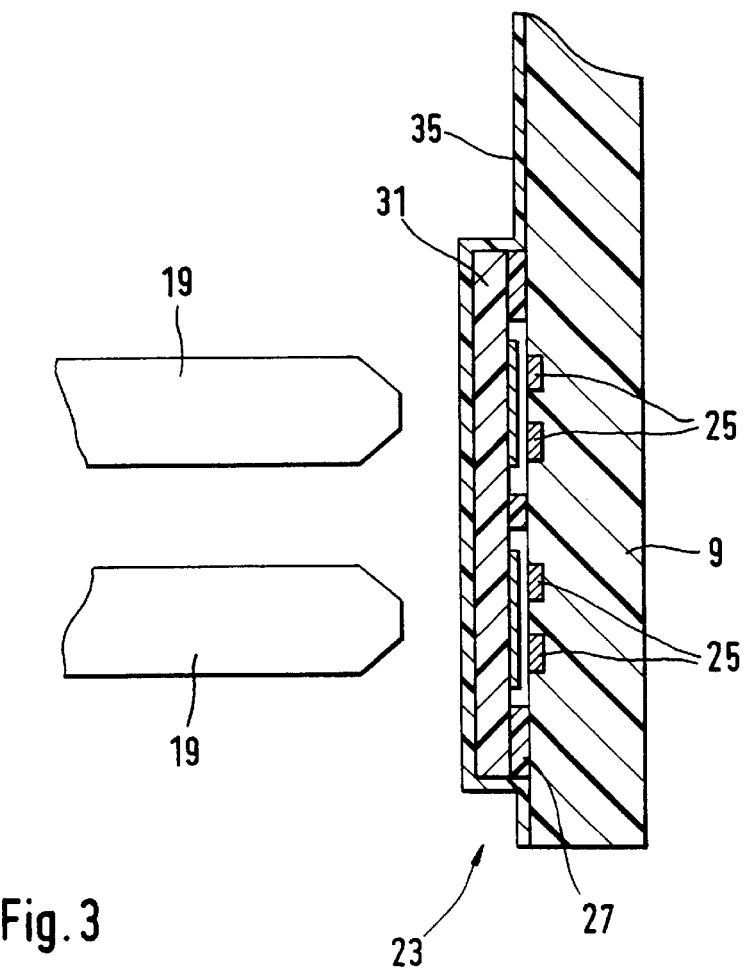
FIG. 3 shows a section through a portion of the printed circuit board on which the membrane keyboard is arranged, and the free ends of the plungers, said ends being opposite the printed circuit board.

FIG. 2 shows an enlargement of a detail from FIG. 1 which illustrates the operating elements 15, the transmitting arrangements 19, the membrane keyboard 23 and a portion of the printed circuit board 9. FIG. 3 shows a section through a portion of the printed circuit board 9 on which the membrane keyboard 23 is arranged, and the free ends opposite this of the plungers.

Figure 4:
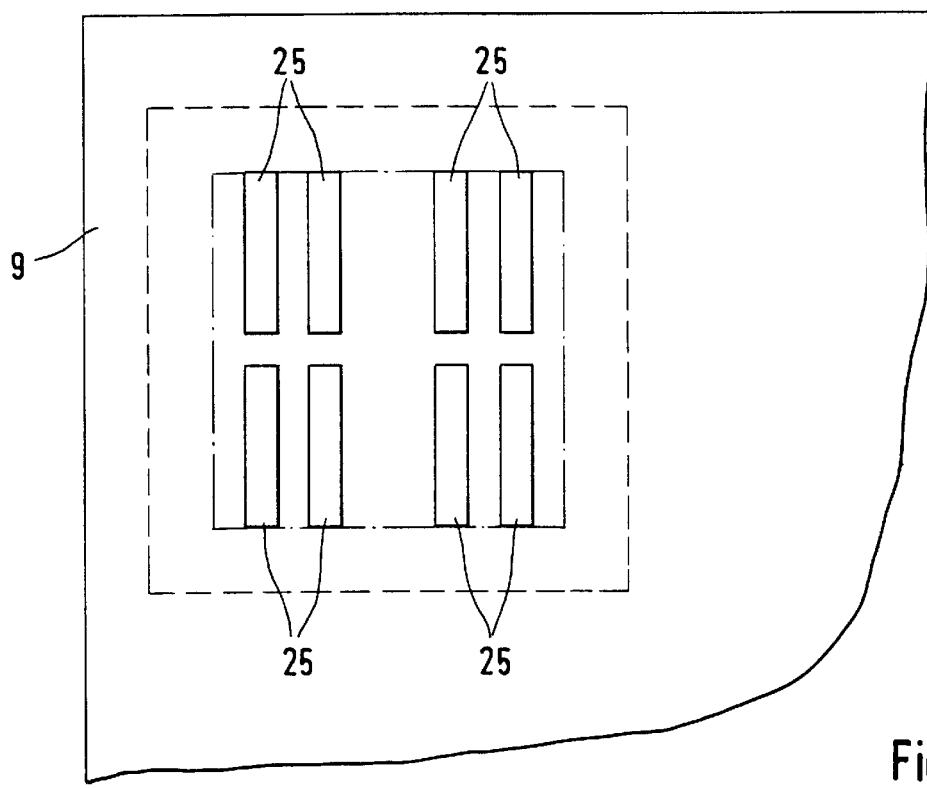
FIG. 4 shows a plan view of the area of the printed circuit board with the exposed conductor tracks.

The membrane keyboard 23 is an integral part of the printed circuit board 9. It is arranged on an area of the printed circuit board 9, on which at least two conductor tracks 25 are exposed. Two conductor tracks 25 in each case are connected to a circuit (not illustrated in the figures), in which an electrical connection between the two conductor tracks 25 effects a switching operation. FIG. 4 shows a plan view of the area of the printed circuit board 9 with the exposed conductor tracks 25.

Figure 5:
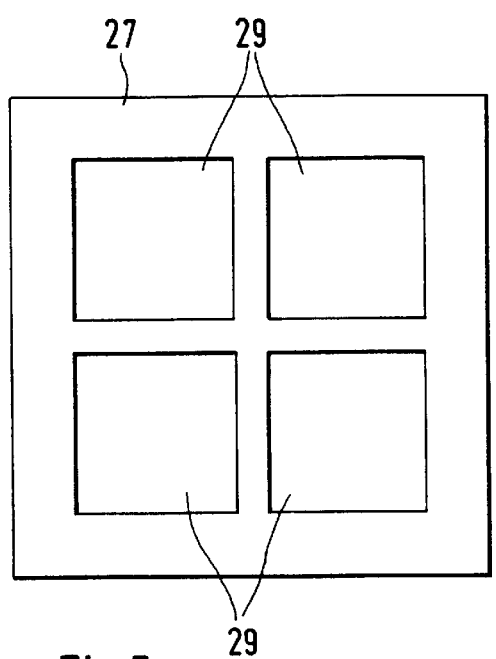
FIG. 5 shows the spacer membrane.

The area has applied to it a spacer membrane 27 made of an insulator, the said spacer membrane being illustrated in FIG. 5. The spacer membrane 27 covers the area on the printed circuit board 9 and has perforations 29 at the locations at which an electrical connection can be established between two conductor tracks 25 in each case.

Figure 6:
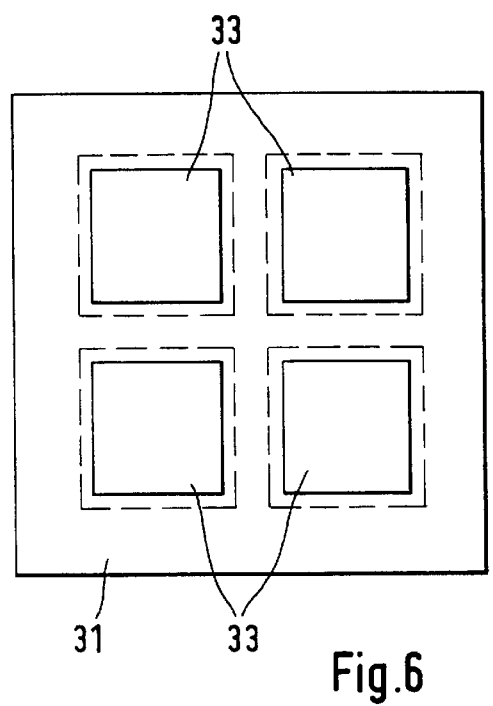
FIG. 6 shows the view of the inner area of the covering membrane.

A covering membrane 31 is arranged on the spacer membrane 27. FIG. 6 shows a view of the inner area of the covering membrane 31, the said inner area facing spacer membrane 27. The covering membrane 31 has contact elements 33 on inner areas which cover the perforations 29 of the spacer membrane 27 and face the printed circuit board 9. The contact elements 33 are composed e.g. of a conductive silver paste applied to the corresponding areas of the covering membrane 31.

The covering membrane 31, the spacer membrane 27 and the printed circuit board 9 form a key in the region of each perforation 29. A pressure exerted on the key causes the covering membrane 31 to flex in such a way that the respective contact element 33 effects an electrically conductive connection between the two conductor tracks 25. Each time a user actuates an operating element 15, by means of the transmitting arrangement 19, the assigned key on the membrane keyboard 23 is pressed and a switching operation is triggered.

The covering membrane 31 and the spacer membrane 27 are both composed of an insulator, e.g. of polyester. They are preferably connected to one another in a tight and permanently elastic manner. Likewise, the spacer membrane 27 is preferably connected tightly to the printed circuit board 9. If the printed circuit board 9 is elastic, a permanently elastic connection is recommended in this case as well. A tight and permanently elastic connection can be realized e.g. using an adhesive, e.g. an acrylate adhesive.

The conductor tracks 9, which are exposed on the printed circuit board 9 and the contact elements 33 are enclosed by the covering membrane 31 and the spacer membrane 27 and the tight connections between printed circuit board 9, spacer membrane 27 and covering membrane 31 effect complete sealing of the enclosed internal spaces. The conductor tracks 25 and the contact elements 33 are permanently protected against moisture and other unfavorable ambient influences.

In the case of the transmitter according to the invention, the transmitting arrangement 19 has merely a mechanical function. It is not Included electrically in the switching operation. Alteration of the surface of the transmitting arrangement 19, e.g. oxidation, does not impair the operability of the transmitter in any way.

Preferably, a surface of the printed circuit board 9 is surface-treated, in particular coated, to provide protection against moisture. In contrast to conventional transmitters, in which exposed conductor tracks had to be excluded from this treatment e.g. by means of a corresponding mask, the entire surface of the printed circuit board 9 including the electronic unit 11 and the membrane keyboard 23 can be surface-treated in the case of a transmitter according to the invention. The surface treatment is illustrated as a surface coating 35 in FIG. 3. Since there are no special areas whatsoever that have to be excluded from the surface treatment, this can be done in a simple work operation

What is claimed is:

1. A transmitter comprising:
   an electronic unit arranged in a housing on a printed circuit board,
   a measurement sensor coupled to the electronic unit, an operating element, which is capable of receiving a force and is operable from outside the housing, and
   a transmitting arrangement, which transmits the force exerted on the operating element to a switch connected to the electronic unit, the switch being a key of a membrane keyboard arranged on the printed circuit board.

2. The transmitter as claimed in claim 1, in which the membrane keyboard is an integral part of the printed circuit board.

3. The transmitter as claimed in claim 1, in which the membrane keyboard
   is arranged on an area of the printed circuit board,
      on which at least two conductor tracks are exposed,
   has a spacer membrane,
      which covers the area and
      which has perforations at the locations at which an electrical connection can be established between two conductor tracks, and
   has a covering membrane,
      which is arranged on the spacer membrane and
      which has contact elements on inner areas which cover the perforations and face the printed circuit board.

4. The transmitter as claimed in claim 3, in which covering membrane, spacer membrane and printed circuit board form a key in the region of each perforation and a pressure exerted on the key causes the covering membrane to flex in such a way that the respective contact element effects an electrically conductive connection between the two conductor tracks.

5. The transmitter as claimed in claim 1, in which a surface of the printed circuit board including the electronic unit and the membrane keyboard is surface-treated, in particular coated, to provide protection against moisture.

6. The transmitter as claimed in claim 2, in which the membrane keyboard
   is arranged on an area of the printed circuit board,
      on which at least two conductor tracks are exposed,
   has a spacer membrane,
      which covers the area and
      which has perforations at the locations at which an electrical connection can be established between two conductor tracks, and
   has a covering membrane,
      which is arranged on the spacer membrane and
      which has contact elements on inner areas which cover the perforations and face the printed circuit board.

7. The transmitter as claimed in claim 6, in which covering membrane, spacer membrane and printed circuit board form a key in the region of each perforation and a pressure exerted on the key causes the covering membrane to flex in such a way that the respective contact element effects an electrically conductive connection between the two conductor tracks.

\* \* \* \* \*